(12) United States Patent
Kida et al.

(10) Patent No.: US 9,471,560 B2
(45) Date of Patent: Oct. 18, 2016

(54) AUTOCORRECTING LANGUAGE INPUT FOR VIRTUAL KEYBOARDS

(75) Inventors: Yasuo Kida, Palo Alto, CA (US); Leland Douglas Collins, Jr., Palo Alto, CA (US)

(73) Assignee: Apple Inc., Cupertino, CA (US)

(*) Notice: Subject to any disclaimer, the term of this patent is extended or adjusted under 35 U.S.C. 154(b) by 958 days.

(21) Appl. No.: 13/487,113

(22) Filed: Jun. 1, 2012

(65) Prior Publication Data

US 2012/0310626 A1    Dec. 6, 2012

Related U.S. Application Data

(60) Provisional application No. 61/493,349, filed on Jun. 3, 2011.

(51) Int. Cl.
G06F 17/27    (2006.01)

(52) U.S. Cl.
CPC .................. *G06F 17/273* (2013.01)

(58) Field of Classification Search
CPC .... G06F 21/83; G06F 3/017; G06F 17/2863; G06F 3/04886; G06F 17/276; G06F 3/0237; G06F 17/273; G06F 3/0234; G06F 3/0236; G06F 3/0238; G06F 9/4443; G06F 17/277; G06F 17/2785; G06F 17/30324; G06F 17/30595; G06F 17/21; G06F 17/27; G06F 17/30448; G06F 17/274; G06F 17/2715; G06F 17/271; G10L 15/22; G10L 15/187; G10L 15/30; G10L 15/14; G10L 15/183; G10L 15/19; G10L 15/063; G10L 15/18; G10L 15/065
USPC ............... 704/7–10, 231, 270, 277
See application file for complete search history.

(56) References Cited

U.S. PATENT DOCUMENTS

| 7,650,445 | B2 | 1/2010 | Ma et al. |
| 8,189,921 | B2* | 5/2012 | Eguchi .............. G06K 9/00449 382/162 |
| 8,232,973 | B2* | 7/2012 | Kocienda et al. ........... 345/173 |
| 2003/0061031 | A1* | 3/2003 | Kida et al. ...................... 704/10 |
| 2003/0182279 | A1* | 9/2003 | Willows ........................... 707/4 |
| 2004/0140957 | A1* | 7/2004 | Casey .................... G09B 5/065 345/168 |
| 2004/0183833 | A1* | 9/2004 | Chua ..................... G06F 3/0237 715/773 |
| 2006/0152496 | A1* | 7/2006 | Knaven ................... G06F 3/023 345/172 |
| 2006/0265648 | A1* | 11/2006 | Rainisto ............... G06F 3/0237 715/259 |
| 2006/0274051 | A1* | 12/2006 | Longe ................... G06F 3/0237 345/173 |
| 2007/0040813 | A1* | 2/2007 | Kushler ................ G06F 3/0237 345/173 |

(Continued)

FOREIGN PATENT DOCUMENTS

WO    WO2010112841    10/2010

*Primary Examiner* — Abdelali Serrou
(74) *Attorney, Agent, or Firm* — Fish & Richardson P.C.

(57) ABSTRACT

Various techniques for autocorrecting virtual keyboard input for various languages (e.g., Japanese, Chinese) are disclosed. In one aspect, a system or process receives a sequence of keyboard events representing keystrokes on a virtual keyboard. A hierarchical data structure is traversed according to the sequence of keyboard events to determine candidate words for the sequence of keyboard events. A word lattice is constructed using a language model, including deriving weights or paths in the word lattice based on candidate word statistics and data from a keyboard error model. The word lattice is searched to determine one or more candidate sentences comprising candidate words based on the path weights. Paths through the word lattice can be pruned (e.g., discarded) to reduce the size and search time of the word lattice.

18 Claims, 9 Drawing Sheets

(56) References Cited

U.S. PATENT DOCUMENTS

| | | | |
|---|---|---|---|
| 2007/0061754 A1* | 3/2007 | Ardhanari | G06F 3/04895 715/816 |
| 2007/0130128 A1* | 6/2007 | Garg | G06F 3/0236 |
| 2007/0152978 A1* | 7/2007 | Kocienda | G06F 3/04886 345/173 |
| 2007/0239432 A1* | 10/2007 | Soong et al. | 704/9 |
| 2008/0059876 A1* | 3/2008 | Hantler | G06F 17/273 715/257 |
| 2008/0167858 A1* | 7/2008 | Christie et al. | 704/10 |
| 2009/0077464 A1* | 3/2009 | Goldsmith et al. | 715/257 |
| 2009/0284471 A1 | 11/2009 | Longe et al. | |
| 2009/0327977 A1* | 12/2009 | Bachfischer | B60K 35/00 715/863 |
| 2010/0235780 A1* | 9/2010 | Westerman et al. | 715/797 |
| 2011/0018812 A1* | 1/2011 | Baird | G06F 3/04886 345/173 |
| 2011/0078563 A1 | 3/2011 | Archer | |
| 2011/0082686 A1 | 4/2011 | Suraqui | |

* cited by examiner

AUTOCORRECTING LANGUAGE INPUT FOR VIRTUAL KEYBOARDS

CROSS-REFERENCE TO RELATED APPLICATION

This application claims priority to U.S. Provisional Application No. 61/493,349, entitled "Autocorrecting Language Input for Virtual Keyboards," filed on Jun. 3, 2011, the entire contents of which are incorporated herein by reference.

TECHNICAL FIELD

This disclosure relates generally to input methods for mobile devices.

BACKGROUND

A computing device typically includes a user interface that may be used to interact with the computing device. The user interface may include a display and/or input device such as a keyboard and/or mouse. The user may use the keyboard to generate a sequence of keyboard events (e.g., typing words). However, a user may incorrectly type a word. For example, a user may intend to type the word "thirst" but instead types the word "theist." The user then either manually corrects the error or relies on an application executing on the computing device to automatically correct the error or suggest one or more replacement words (e.g., spelling corrections). In cases where the application on the computing device automatically corrects spelling errors or suggests one or more spelling corrections, the application typically includes one or more dictionaries or language data that are used to determine whether a received keystroke sequence corresponds to a known word or sentence, and also to determine an appropriate correction or a set of candidate replacement words or sentences when the received keystroke sequence does not correspond to a known word or sentence.

SUMMARY

Various techniques for autocorrecting virtual keyboard input for various languages (e.g., Japanese, Chinese) are disclosed. In one aspect, a system or process receives a sequence of keyboard events representing keystrokes on a virtual keyboard. A hierarchical data structure is traversed according to the sequence of keyboard events to determine candidate words for the sequence of keyboard events. A word lattice is constructed using a language model, including deriving weights or paths in the word lattice based on candidate word statistics and data from a keyboard error model. The word lattice is searched to determine one or more candidate sentences comprising candidate words based on the path weights. Paths through the word lattice can be pruned (e.g., discarded) to reduce the size and search time of the word lattice.

Other implementations include systems and computer-readable mediums. Particular implementations provide one or more of the following advantages. Combining a virtual keyboard error model with a language model to weight paths in a word lattice used to determine candidate sentences, provides improved language autocorrecting accuracy over conventional systems and methods that rely on a language model alone. Pruning techniques are advantageously used to discard paths of the word lattice.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

Language Input Interfaces with Autocorrecting

Figure 1A:
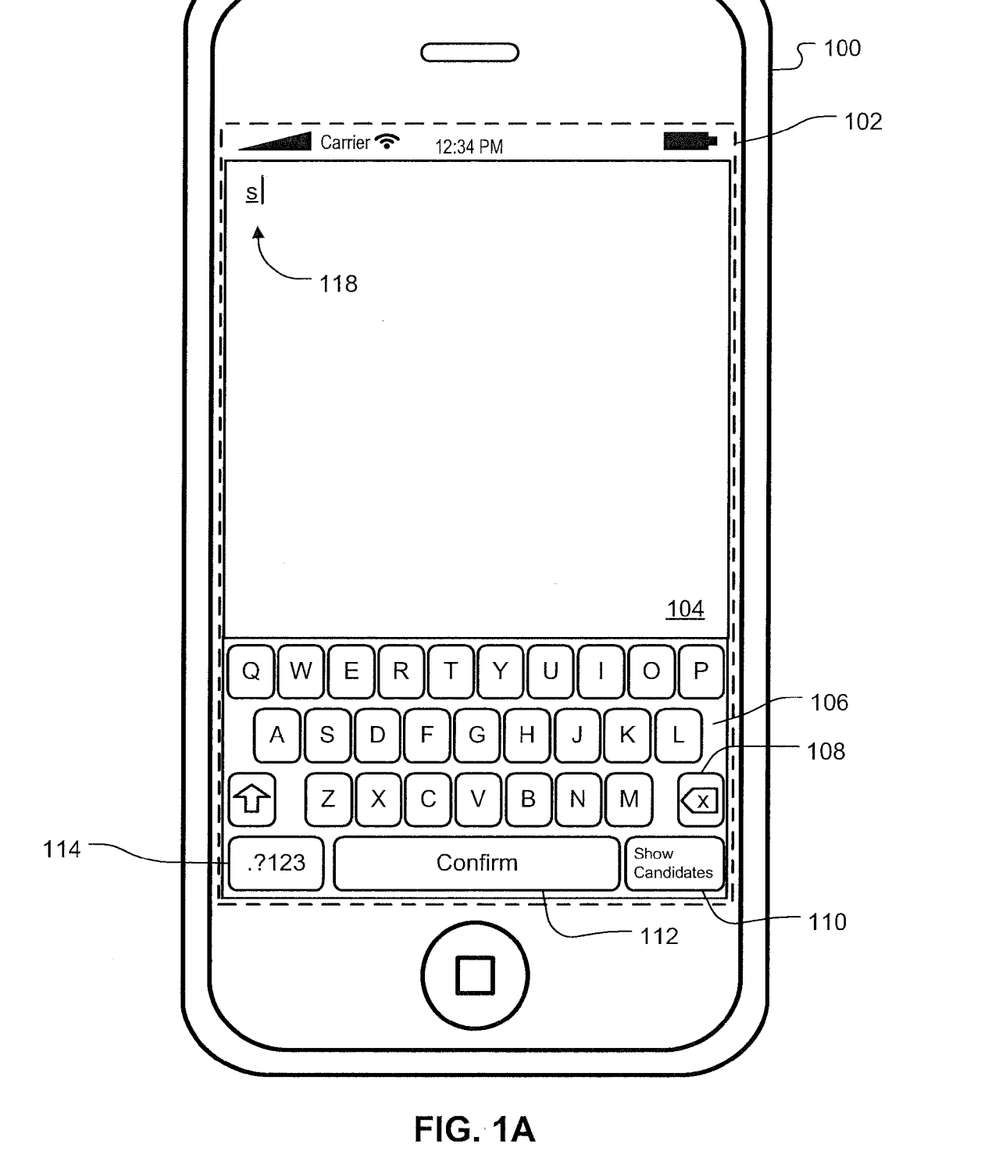
FIGS. 1A-1C show exemplary language input interfaces with autocorrecting.
Figure 1B:
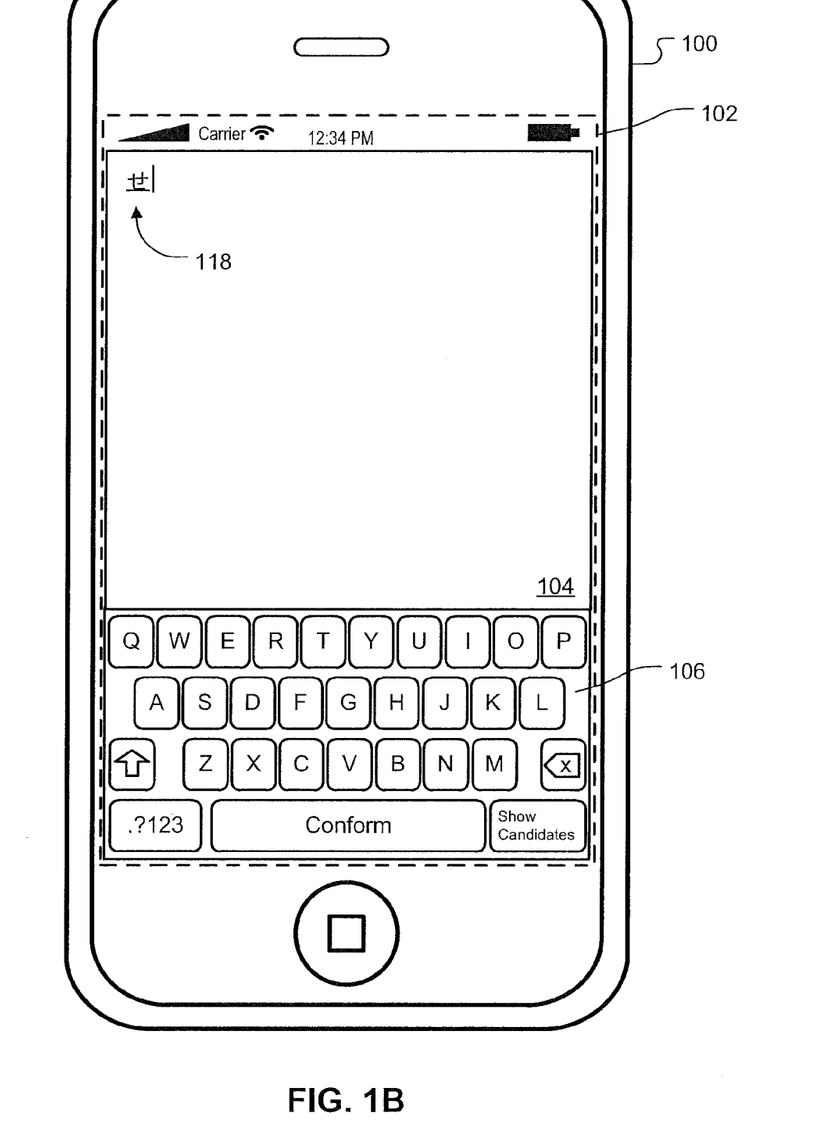
Figure 1C:
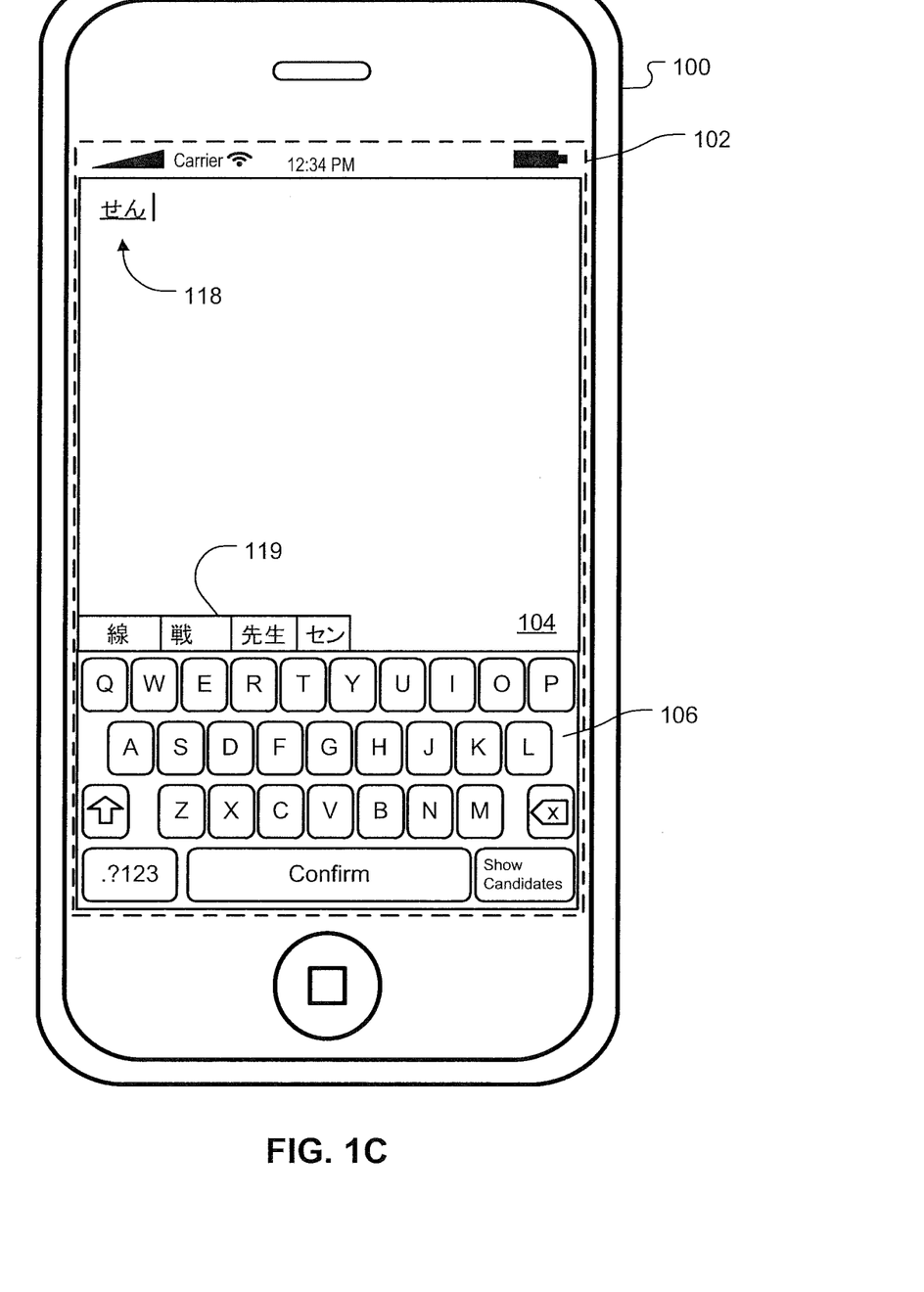

FIGS. 1A-1C show exemplary language user interfaces with autocorrecting. The language interfaces can be generated and displayed on touch sensitive display 102 of mobile device 100. Mobile device 100 can display text input area 104 and a virtual keyboard 106 on touch-sensitive display 102. Text input area 104 can be any area where input text can be displayed, e.g., a note-taking application, an email application, and the like. In some implementations, text input area 104 can be one or more text fields located in a document (e.g., a web page rendered in a web browser application). Virtual keyboard 106 includes one or more virtual keys 116 that each correspond to a letter in an alphabet (e.g., Latin alphabet). Virtual keys can include a keyboard toggle key 114 for toggling between letter keys and keys for numbers, punctuation, etc. A user can enter text by touching touch-sensitive display 102 on the areas of the desired virtual keys of virtual keyboard 106. Letters, numbers or symbols corresponding to touched keys are displayed in text input area 104 as unconverted current input 118. The user can hit backspace key 108 to delete the last input character.

In some implementations, mobile device 100 includes capability to input text in a non-English language using a Latin alphabet virtual keyboard. For example, mobile device 100 can include capability for inputting Chinese and/or Japanese text, including Chinese or Japanese characters and symbols, using the Latin alphabet virtual keyboard (e.g., a virtual keyboard with letters arranged in a QWERTY layout). For example, a user can use the virtual keyboard to enter a phonetic string of letters representing sounds or syllables in the non-English language. For example, a user can user the virtual keyboard to type in a Romanization of one or more characters or symbols in Chinese or Japanese.

For convenience, the implementations in this specification will be described in reference to entry of Japanese language text. It should be appreciated, however, that the described implementations can be applied to other non-English languages (e.g., Chinese). More generally, the described implementations can be applied to any text input interface that involves identification, presentation, and selection of candidates for inputs, regardless of language (e.g., Latin alphabet Romanization to non-Latin-alphabet text, spelling and grammar correction, thesaurus features).

When a user inputs in a first letter of a phonetic string, the letter is displayed in text input area 104 as an unconverted current input 118, as shown in FIG. 1A. In some implementations, input 118 is displayed with underlining or some other formatting (e.g., bold text, italics, highlighting). The underlining/formatting indicates that the input is a provisional input subject to conversion pending additional input from the user, whether that additional input is additional letters or a selection of a candidate by the user. For example, in FIG. 1A, the user touches the "s" key, and the letter "s" is displayed in text input area 104 as current input 118 with underlining.

Virtual keyboard 106 can include confirm key 112 that, when touched by the user, accepts input 118 as is. The accepted input can be displayed without the underlining. For example, in FIG. 1A, the user can touch confirm key 112 to accept the input string "s"; "s" is displayed without underlining. In some implementations, touching confirm key 112 also adds a space after the accepted input. In some other implementations, the addition of the space after the accepted input depends on whether the accepted input is in a language where spaces separate words and/or whether the accepted input is the end of a sentence, to name a few example criteria. In some implementations, key 112 is a "space" key that, when touched, accepts the current input, effectively serving as a "confirm" key.

In some implementations, virtual keyboard 106 can also include show candidates key 110. By touching show candidates key 110, the user can bring up a tray of candidate characters, symbols, and combinations thereof (e.g., kanji, kana combinations) with which to replace input 118. The tray of candidates is further described below.

Continuing from the example input 118 shown in FIG. 1A, the user next touches the letter "e" on keyboard 106, resulting in the string "se." The string "se" can be converted by the device 100 to the hiragana symbol "せ", of which the string "se" is the Romanization, and the hiragana symbol "せ" is displayed as converted current input 118 with underlining, as shown in FIG. 1B. The user can touch confirm key 112 to accept the hiragana symbol "せ"; "せ" is then displayed without underlining. Alternatively, the user can touch show candidates key 110 to bring up the tray of candidates related to the string "se" (e.g., characters whose phonetic readings begin with "se").

Continuing from the example input 118 as shown in FIG. 1B, the user next touches the "n" key, resulting in the string "sen." The terminal "n" letter is converted to the hiragana symbol "ん", of which the terminal "n" is the Romanization, and appended to the already-converted hiragana symbol "せ". The hiragana symbol "せん" is displayed as converted current input 118 with underlining, as shown in FIG. 1C.

In some implementations, mobile device 100 can display candidate tray 119 including one or more suggested candidates for input 118. Candidate tray 119 can be presented "inline" with input 118 or in another desired location, such as fixed above virtual keyboard 106 as shown in FIG. 1C. The suggested candidates can include single characters, phonetic symbols (e.g., Japanese kana), and combinations of multiple characters and/or phonetic symbols. For example, in FIG. 1C, the kanji character "線" is displayed as a suggested candidate for "せん"; "せん" ("sen") is the onyomi reading for the kanji character "せ". In some implementations, the user can touch a suggested candidate to select a suggested candidate, continue typing letter keys on the virtual keyboard 106 to add to input 118, or touch show candidates key 110 to bring up the candidates tray, among other actions. If the user selects a suggested candidate, the selected suggested candidate is displayed as accepted input. If the user continues typing on the letter keys on virtual keyboard 106, current input 118 is extended and possible candidates for current input 118 are narrowed down.

In some implementations, the one or more suggested candidates in candidate tray 119 that are presented to the user are determined by mobile device 100 to be the best match for input 118 using language dictionary searching techniques described in reference to FIGS. 2-5.

Exemplary Language Dictionary Searching

Figure 2:
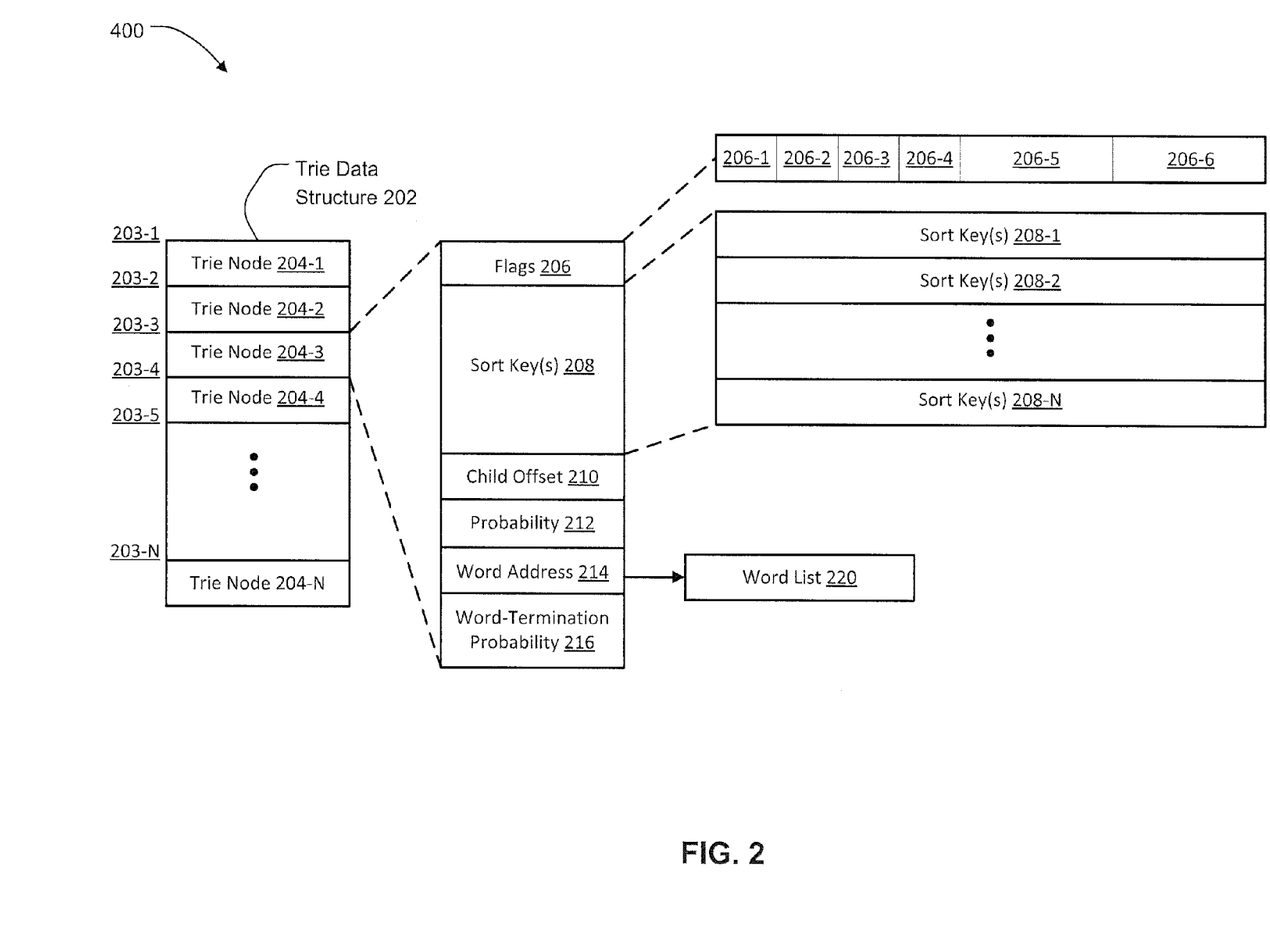
FIG. 2 is block diagram of an exemplary hierarchical data structure for searching language dictionaries.

FIG. 2 is block diagram of an exemplary hierarchical data structure 202 for searching language dictionaries. In some implementations, the hierarchical data structure is trie data structure. A trie data structure, also called a prefix tree, is an ordered tree data structure that is used to store information. The keys to the nodes are strings, and the position of each node in the tree corresponds to its key. All descendants of a node in trie data structure have a common prefix of the string associated with that node. The root of the trie data structure is typically associated with an empty string.

In some implementations, trie data structure 202 is stored in memory of a device (e.g., mobile device 100). Trie data structure 202 can include a plurality of trie nodes 204 located at memory addresses 203 in memory 650. A respective trie node 204-3 includes flags field 206 and sort keys field 208. A sort key is a character that represents all forms (e.g., accented, unaccented, capitalized, uncapitalized) of the character. For example, the sort key "e" may represent the following characters forms "e", "E", "e", "e", " ", "e", and " ". Thus, instead of using multiple nodes of trie data structure 202 to represent the different character forms of "e", all of the character forms of "e" are represented by a single node of trie data structure 202. Furthermore, in some implementations, each sort key has a default character form, for example a character form without accents or the like.

Flags field 206 may include child field 206-1 that indicates that trie node 204-3 is associated with one or more child nodes of trie data structure 202, frequency field 206-2 that indicates that trie node 204-3 is associated with a frequency value field as described below, word-termination probability field 206-3 that indicates that trie node 204-3 is associated with a probability that a sequence of trie nodes traversed in trie data structure 202 that ends at trie node 204-3 represents one or more complete words, word list field 206-4 that indicates that trie node 204-3 is associated with a word list as described below, child offset type field 206-5 that indicates the length of an address (e.g., 8 bits, 16 bits, 24 bits, etc.) that points to a child trie node of trie node 204-3, sort key field 206-6 that indicates the number of sort keys field 208 associated with trie node 204-3. In some implementations, flags field 206 is a bit-packed field. For example, flags field 206 may be 8 bits, where child field 206-1, frequency field 206-2, word-termination probability field 206-3 and word list field 206-1 may be one-bit fields, and child offset type field 206-5 and sort key field 206-6 are two-bit fields.

In some implementations, a respective trie node 204 may be associated with two or more sort keys when the respective trie node 204 only includes a single child node. Thus, the sort keys field 208 may include a plurality of sort keys associated with trie node 204-3. For example, trie node 204-3 may be associated with the sort keys "s" and "t." Accordingly, the sort keys "s" and "t" are stored in sort keys field 208 for trie node 204-3.

The respective trie node 204-3 may optionally include child offset field 210, probability field 212, word address field 214, word-termination probability 216, and any combination of these fields. Child offset field 210 can include an address of a child node of trie node 204-3. In some implementations, the address is an address offset relative to the address 203-3 of a location in memory of trie node. In some implementations, the address is an absolute address. In some implementations, child offset field 218 is a variable length field whose length is denoted by child offset type field 206-5. For example, child offset type field 206-5 may indicate that an address in the child offset field is 16 bits long. Probability field 212 indicates the relative probability, relative to siblings of a current trie node (e.g., children of an immediate ancestor node of the current trie node), that characters associated with the current trie node follow characters associated with the immediate ancestor trie node. For example, if the immediate ancestor trie node has five children trie nodes, the relative probabilities that characters associated with each of the five children trie nodes would follow characters associated with the immediate ancestor trie node would be indicated by probability fields 212 in those five children nodes. Note that the frequency that a given word in trie data structure 202 occurs in a training corpus (e.g., a dictionary that includes a set of valid words for a respective language) is calculated by multiplying the total number of words in the corpus by the probability of each of trie nodes 204 traversed in trie data structure 202 to form the word.

A trie node that is associated with one or more words is referred to as a "word node." Both internal trie nodes and leaf trie nodes may be word nodes. In some implementations, if trie node 204-3 is associated with one or more complete words, word-termination probability flag 206-3 of trie node 204-3 will be set and trie node 204-3 will include word-termination probability 216 having non-zero value, indicating the likelihood that the keystroke that caused the process to reach trie node 204-3 is the last keystroke of the word being entered by the user. In some implementations, word-termination probability 216 is set only for internal trie nodes that correspond to at least one complete word. In these implementations, leaf trie nodes (e.g., trie nodes that do not have any children trie nodes) always correspond to at least one complete word, and therefore the word-termination probability is inherently set to 1.0. Accordingly, leaf trie nodes do not include an explicit word-termination probability field.

Furthermore, when a word node is associated with more than one word, or when any word associated with the node differs from a word derived from a sequence of traversed nodes (e.g., a "default form" of the word) ending at the word node, then the word node includes word address field 214. Word address field 214 specifies the address of a location in memory of a first word in a word list (e.g., word list 220). In some implementations, the address is an address offset relative to the address of a location in memory of trie node 203-3, while in other implementations the address in word address field 214 is an absolute address.

In some implementations, word nodes that correspond to only a single word, which is the "default" word form for the sequence of trie nodes 204 ending at the word node, do not include a pointer or offset (e.g., see word address field 214) to a word list. This applies to both internal trie nodes and leaf trie nodes that are word nodes. In these implementations, the default word form for a word node is the sequence of default character forms for the sequence of trie nodes traversed to arrive at the word node. These implementations reduce the size of a dictionary by at least the amount of space saved by not using word lists to represent single words that are the default form (and only word) corresponding to the sequence of traversed trie nodes for the word node.

In other implementations, even greater compression can be achieved by making the default character forms for a sequence of trie nodes to be context dependent, thereby reducing the number of word nodes that require a word list. For example, if a particular letter always or almost always has a first variation (e.g., a particular accent) when preceded (and/or followed) by a particular pattern of characters, the first variation of that letter would be the default character form in that context. More generally, a set of rules may be provided to define the default character forms for various letters or characters in accordance with the context of the letter or character. An example of such a rule is: in the French language, the default form for the character "c" is "c" except when the character "c" is preceded by at least two characters and followed by an "a," in which case the default form for the character "c" is "ç" (c with cedilla). In accordance with this example of a rule, if a user, while entering text in the French language, enters a plurality of characters followed by the characters "c" and "a", the default form of the word is " . . . ça . . . " (with diacritic marks), where the ellipses represent characters preceding and following the characters "c" and "a". On the other hand, if the user enters the characters "c" and "e", the default form of the word is " . . . ce . . . " (without diacritic marks) because the cedilla ("ç") in French never precedes the vowels "e" or "i".

In some implementations, when a word cannot be derived solely from the sequence of traversed trie nodes (e.g., based on a sequence of keyboard events) or when a word's final form requires modification, the trie node is associated with a word list that includes one or more words.

Figure 3:
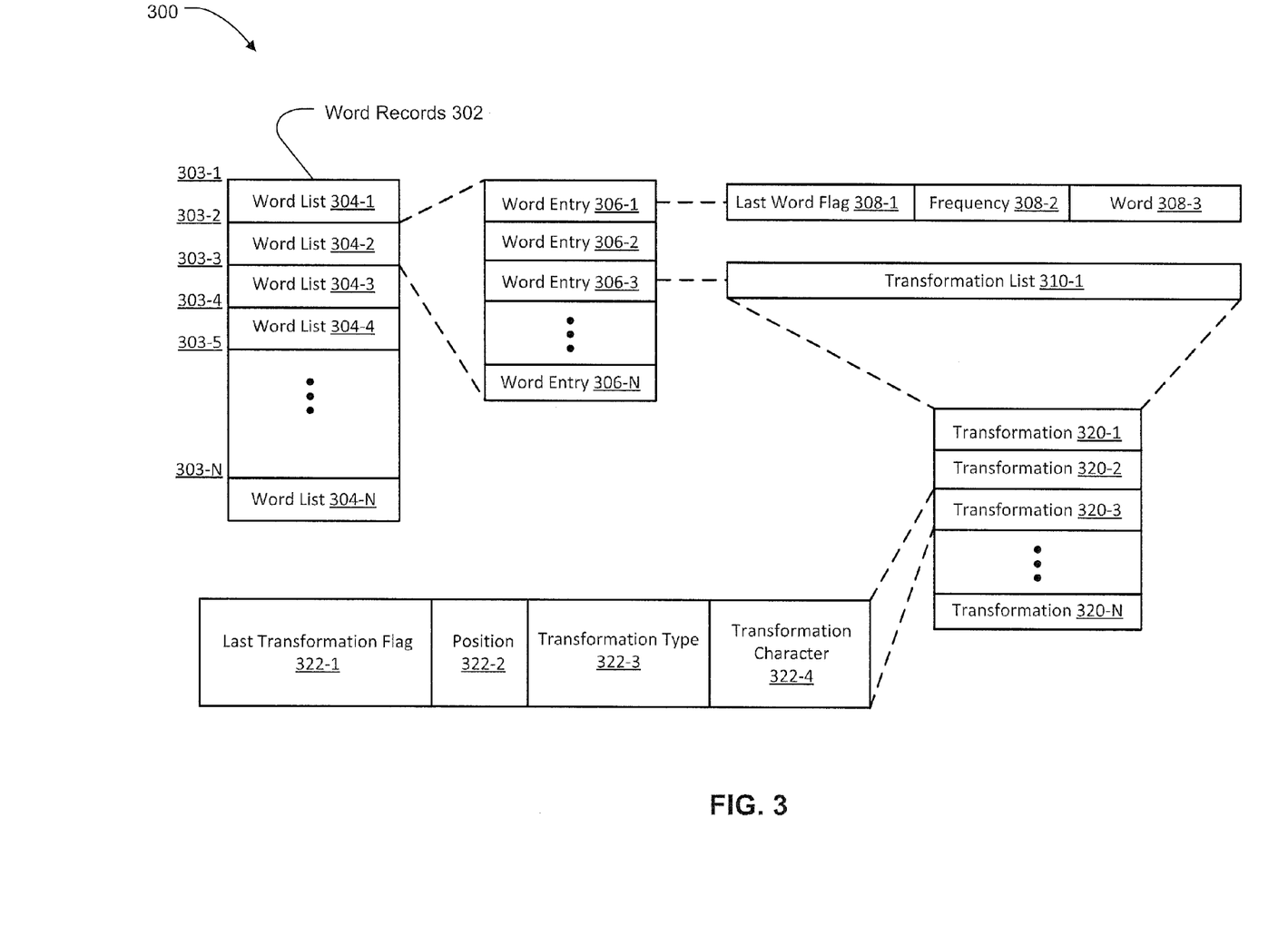
FIG. 3 is a block diagram of an exemplary word list of the data structure of FIG. 2.

FIG. 3 is a block diagram of an exemplary word list of the data structure of FIG. 2. In some implementations, word records 302 are stored in memory of a device (e.g., memory 310 in FIG. 3). The word records 302 include a plurality of word lists 304 located at addresses 303 in memory of the device. A respective word list 304-2 includes one or more word entries 306.

A respective word entry 306-1 may include last word flag 308-1, frequency flag 308-2, and word 308-3. Since the words in word list 304-2 may be stored in sequential locations in memory of the device, last word flag 308-1 indicates whether word entry 306-1 is the last word entry in word list 304-2. Frequency 308-2 indicates the frequency that word 308-3 of word entry 306-1 appears in a respective language. Note that frequency field 308-3 is typically used to select a single word (or to generate a ranked list of words) when there are two or more word entries in a respective word list. For Japanese or Chinese language, the contents of frequency field 308 can be used to derive path weights for a word lattice, as described in reference to FIGS. 4 and 5.

In some implementations, a respective word entry 306-3 includes transformation list 310-1. Transformation list 310-1 may include one or more transformation operations 320 that indicate specified transformations to be performed on a word derived from a traversed sequence of trie nodes 204 (e.g., traversed based on a sequence of keyboard events) in trie data structure 202 to produce a word. A respective transformation 320-3 includes last transformation flag 322-1 that indicates whether transformation 320-3 is the last transformation in the transformation list 310-1 associated with a respective trie node of trie data structure 202, position field 322-2 that indicates a position in the derived word on which to perform the transformation, transformation type 322-3 that indicates a type of transformation to be performed (e.g., inserting characters, deleting characters, substitution characters, combining characters), and an optional transformation character 322-4 that is the character(s) that is used by transformation operation 320-3.

In some implementations, characters (e.g., Chinese pinyin syllables) can be used in place of English words. The trie search described above can be used to generate pinyin text and a Chinese language model can be used to parse the pinyin text into words.

A further description of using trie data structures for language autocorrecting can be found in U.S. Patent Publication No. 2010/0235780, for "System and Method for Identifying Words Based on a Sequence of Keyboard Events," filed Jul. 17, 2009, which publication is incorporated herein by reference in its entirety.

Japanese & Chinese Languages

The trie dictionary search methods described in reference to FIGS. 2 and 3 can be applied to Japanese and Chinese languages. In the case of Japanese or Chinese language dictionary search, a single sequence of keyboard events can produce word lists 220 that include multiple Japanese or Chinese words. The Japanese or Chinese words can comprise multiple Japanese or Chinese syllables. Additionally, there are no word boundaries in Japanese or Chinese language that are indicated by word boundary characters, such as spaces used in English language.

To deal with the ambiguity of multiple words for a single keyboard event sequence and the lack of word boundary characters, a word lattice (or trellis) can be constructed for all possible substrings of words for the Japanese or Chinese languages using dynamic programming (e.g., Viterbi algorithm). The paths (edges) through the word lattice can be weighted with transition probabilities, such that the N "best" paths through the word lattice can be determined using a search algorithm (e.g., Viterbi algorithm). The transition probabilities used in the word lattice can be derived from candidate word statistics and data from a keyboard error model (e.g., probability that a sequence of keyboard events includes keystroke error). In the context of Japanese and Chinese language, a "word" can include multiple characters.

Users of virtual keyboards on mobile devices will often touch incorrect keys. To improve recognition accuracy, a keyboard error model can be used that searches for a geometric pattern of keys that best matches the geometric pattern of a touch sequence. The error model can hypothesize plausible sequences of keys by extending existing sequences with keys that are within an immediate neighborhood of the newest finger touch. An exemplary system and method using this technique is described in U.S. Pat. No. 6,677,932, for "System and Method for Recognizing Touch Typing Under Limited Tactile Feedback Conditions," filed Jan. 28, 2001, which patent is incorporated herein by reference in its entirety.

In some implementations, paths through the word lattices can be weighted with a conditional probability P(w|c), which is the probability that a given path through the lattice will unambiguously produce candidate sentences for a given language for a given sequence of keyboard events (e.g., touches). In some implementations, P(w|c) can be given by $$P(w|c)=P(c|w)P(w)/P(c), \qquad [1]$$

where w is a word and c is a sequence of touches with possible errors. P(c) is a constant given c. P(w) can be determined from a word unigram frequency or n-gram language model. In some implementations, P(w) can be derived from frequencies 308 (divided by the total words in corpus) associated with candidate words resulting from the trie search described in reference to FIGS. 2 and 3. P(c|w) can be derived from keyboard error model data (e.g., a geometric cost factor), using the techniques described in U.S. Pat. No. 6,677,932. A list of top N words that maximizes P(w|c) in the word lattice search (e.g., N best path(s) through word lattice) can then be selected as candidate sentences to be displayed to the user on a screen of the device.

Figure 4:
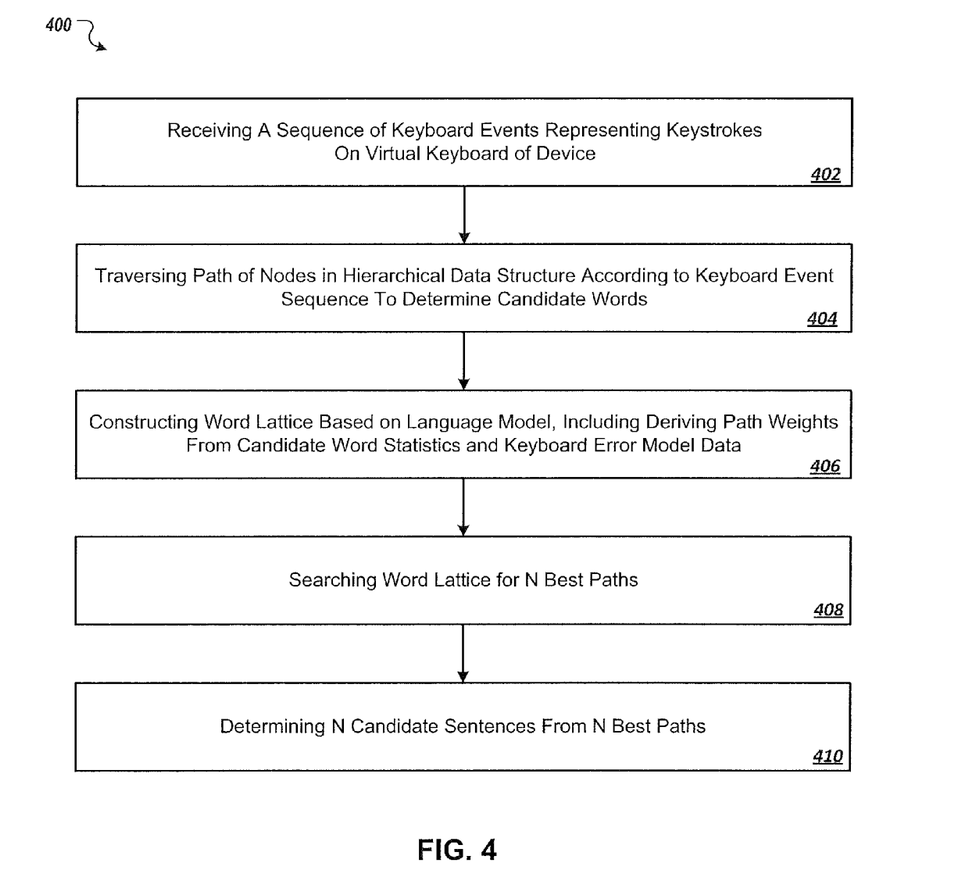
FIG. 4 is a flow diagram of an exemplary process for autocorrecting language input using a word lattice.

FIG. 4 is a flow diagram of an exemplary process 400 for language autocorrecting. In some implementations process 400 can begin by receiving a sequence of keyboard events representing keystrokes input to a virtual keyboard (402).

Process 400 can continue by traversing a path of nodes in a hierarchical data structure according to the sequence of keyboard events to determine candidate word(s) (404). The hierarchical data structure can be a trie data structure, as described in reference to FIGS. 2 and 3.

Process 400 can continue by constructing a word lattice based on a language model, including deriving weights for paths through the word lattice from candidate word statistics and a keyboard error model (406). The lattice can be constructed using dynamic programming and a search algorithm (e.g., Viterbi algorithm). The candidate word statistics can be derived from candidate word frequencies, resulting from a trie data structure search. The keyboard error model data can be provided using the techniques described in U.S. Pat. No. 6,677,932.

Process 400 can continue by searching the word lattice for N best paths (408). For example, a Viterbi algorithm can be used to search the word lattice to determine N best paths through the word lattice based on the weights.

Process 400 can continue by determining N candidate sentences from the N best paths (410). Once the candidate sentences are determined, they can be displayed on the device.

Exemplary Pruning Process for Word Lattice

To keep the memory and time requirements tractable, pruning process 500 can be applied to the word lattice using the exemplary pseudo code below. The pruning can be performed with the likelihood of the spelling given a touch sequence, and not with the frequency of the word itself. This way of pruning allows a user to type rare words (if there is no higher frequency homophone). To implement pruning process 500, word lists of candidate words (probable words) are obtained for all possible substrings of a complete sequence of keyboard events. For example, the word lists from trie data structure 302 of FIG. 3 can provide the candidate words for substrings. The word lists are then added to the word lattice as nodes and the paths weighted, as described in reference to FIG. 4. A search algorithm (e.g., Viterbi algorithm) can then find the most probable combination of words (a sentence) searching the word lattice. The example pseudo code below can implement pruning process 500.

Example Pseudo Code

```
traverse_with_a_touch( Node current_trie_node, Touch touches, int
touch_index, int avarage_log_likelihood) {
    if there is no more touches beyond touch_index
        if there is a word ending with current_trie_node
            store this word.
        return
    for each hypothesized_key in each
    touches[touch_index].all_hypotheses {
        log_likelihood_of_the_hypothesized_key =
        hypothesized_key->log_likelihood
        /* PRUNING1: if the likelihood is lower than the threshold for
the single touch, then don't pursue this branch. */
        if log_likelihood_of_the_hypothesized_key <
THRESHOLD_FOR_SINGLE_TOUCH
            continue
        /* update the avarage_log_likelihood. Note, as the likelihood is
converted to log likelihood, you can just get the arithmetic mean. */
        average_log_likelihood = (average_log_likelihood *
touch_index + log_likelihood_of_the_hypothesized_key) /
(touch_index+1)
        /* PRUNING2: if the average_log_likelihood is lower than the
threshold for the average, then don't pursue this branch */
        if average_log_likelihood < THRESHOLD_FOR_AVERAGE
            continue
        character_code_for_the_hypothesized_key =
        hypothesized_key->character_code
        next_node =
find_node_for_a_character
(character_code_for_the_hypothesized_key)
        /* if the next node does not exist, i.e. there is no such spelling,
we do not accept this character. */
        if next_node == NULL
            continue
        /* decent one level deeper, i.e. go to the next character. */
        traverse_with_a_touch( next_node, touches,
++touch_index, average_log_likelihood);
    }
}
```

Referring to the pseudo code above, the threshold for a single touch discards keys (nodes) that are too far from a touch. For example, if a user touches the center of keys RREE, the word "TREE" might still be considered as a candidate because the "T" key is geometrically close to the "R" key on the virtual keyboard (See keyboard layout in FIG. 1A). If the user touches the center of keys AREE, however, the word "TREE" would not be considered as a candidate because the "T" key is far from the "A" key on the virtual keyboard.

The threshold for the average log likelihood looks at accumulated likelihood of words. For example, if you touched RREE, "TREE" would be hypothesized from the touches because only a single mis-touch of "R" instead of "T" has occurred. By contrast, if you touched RRDD, the word "TREE" would not be hypothesized from the touches because too many mis-touches have occurred to hypothesize "TREE."

Figure 5A:
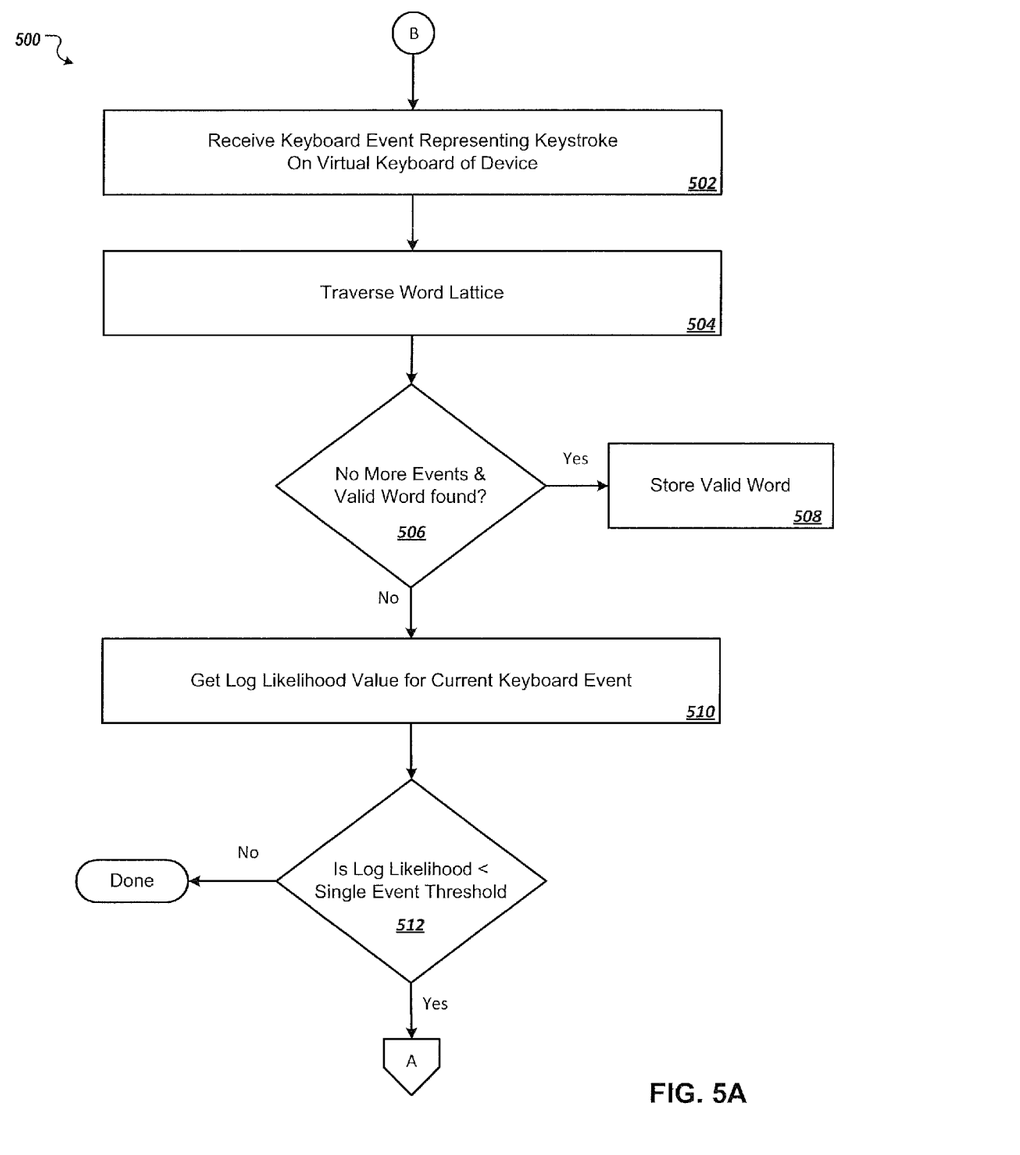
FIGS. 5A-5B are flow diagrams of an exemplary pruning process for pruning the word lattice.
Figure 5B:
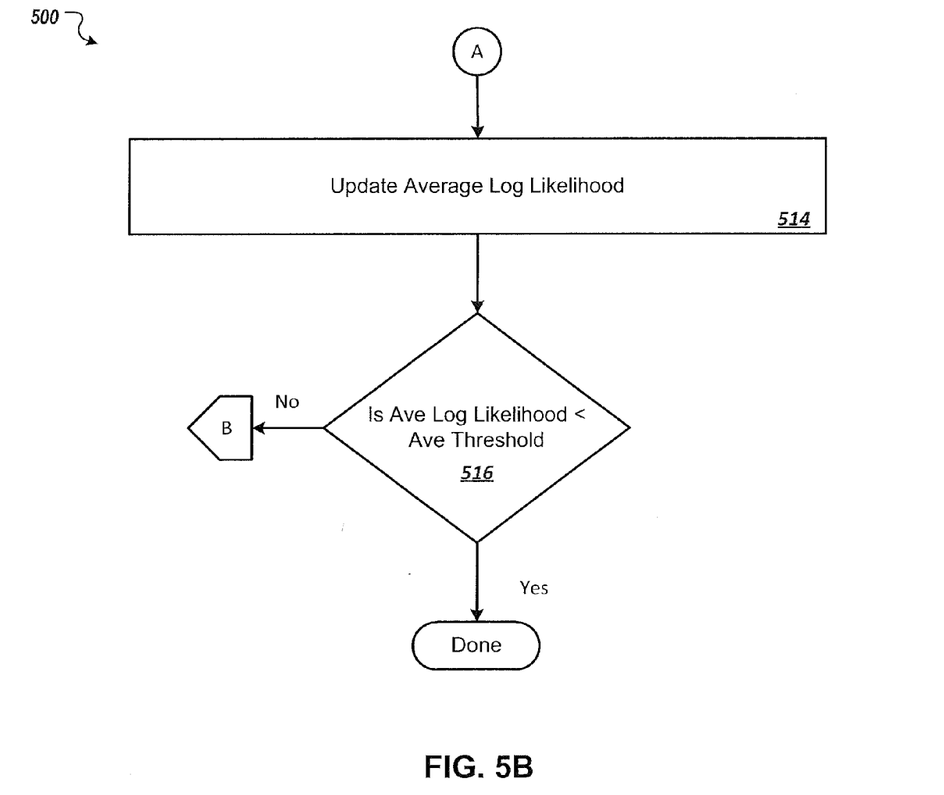

FIGS. 5A-5B is a flow diagram of an exemplary pruning process 500 for pruning the word lattice. Process 500 can begin by receiving a keyboard event representing a keystroke on a virtual keyboard of a device (502).

Process 500 can continue by traversing a word lattice (504). The word lattice can include paths weighted based on candidate word statistics and data from a keyboard error model, as described in reference to FIG. 4.

If process 500 determines (506) that there are no more events to be processed and a valid word has been found, then the valid word is stored (508). If process 500 determines (506) that there are more events or a valid word is not found, then process 500 determines a log likelihood for the keyboard event (510), and determines (512) if the log likelihood is less than a threshold for a single keyboard event (e.g., a single touch).

If the log likelihood is less than the threshold for a single keyboard event, the path in the word lattice is discarded. If the log likelihood is not less than the threshold for a single keyboard event, then process 500 updates an average log likelihood (514), and determines (516) if the updated average log likelihood is less than an average likelihood threshold.

If the average log likelihood is less than the average likelihood threshold, the path in the word lattice is discarded. Otherwise, process 400 returns to step (502) to receive the next keyboard event.

Exemplary Device Architecture

Figure 6:
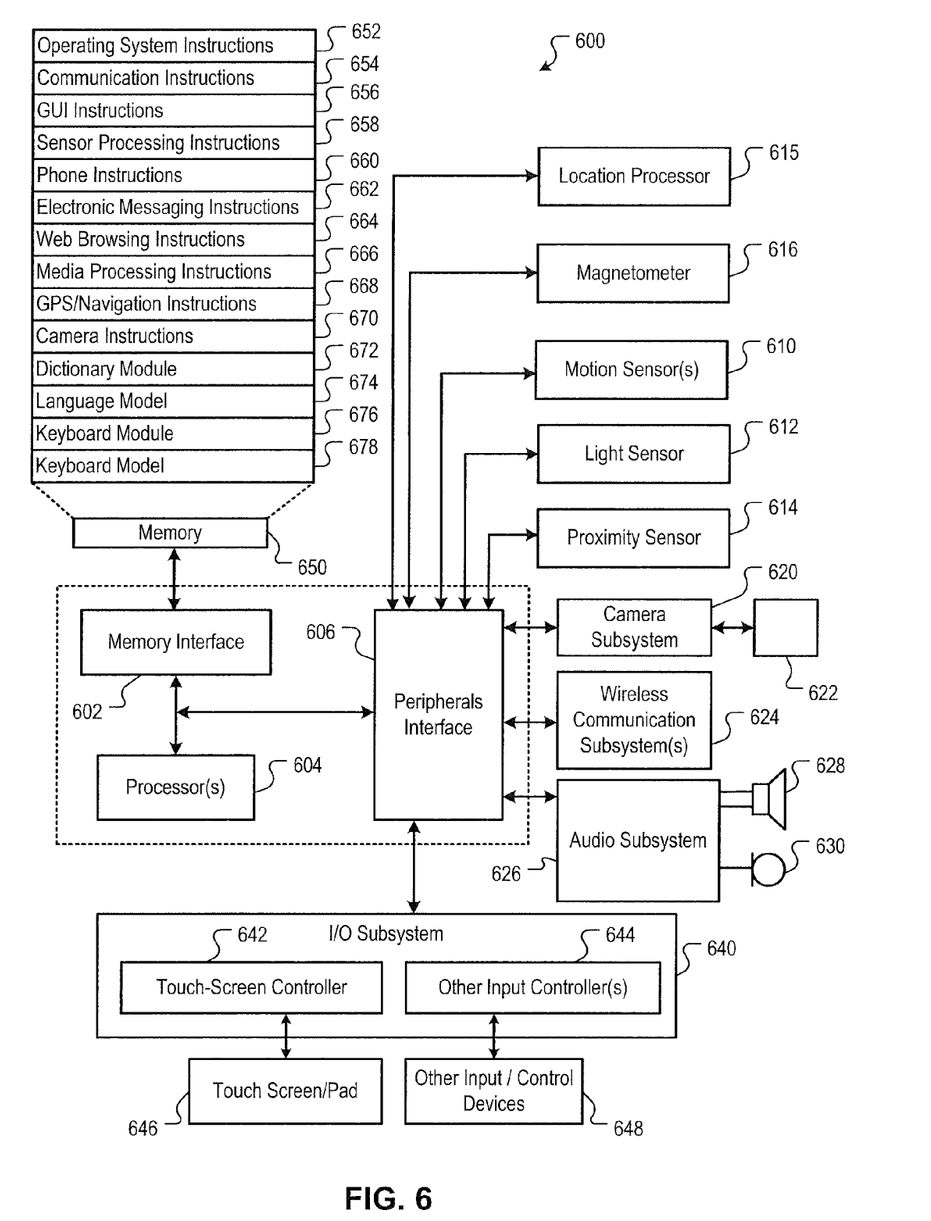
FIG. 6 is a block diagram illustrating exemplary device architecture implementing features and operations described in reference to FIGS. 1-5B.

FIG. 6 is a block diagram illustrating exemplary device architecture implementing features and operations described in reference to FIGS. 1-5B. Device 600 can be any device capable of capturing handwriting on a touch sensitive surface, including but not limited to smart phones and electronic tablets. Device 600 can include memory interface 602, one or more data processors, image processors or central processing units 604, and peripherals interface 606. Memory interface 602, processor(s) 604 or peripherals interface 606 can be separate components or can be integrated in one or more integrated circuits. The various components can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. For example, in some implementations, light sensor 612 can be utilized to facilitate adjusting the brightness of touch screen 646. In some implementations, motion sensor 610 (e.g., an accelerometer, gyros) can be utilized to detect movement and orientation of the device 600. Accordingly, display objects or media can be presented according to a detected orientation, e.g., portrait or landscape.

Other sensors can also be connected to peripherals interface 606, such as a temperature sensor, a biometric sensor, or other sensing device, to facilitate related functionalities.

Location processor 615 (e.g., GPS receiver) can be connected to peripherals interface 606 to provide geo-positioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems. Wireless communication subsystems 624 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 624 can depend on the communication network(s) or medium(s) over which device 600 is intended to operate. For example, a mobile device can include communication subsystems 624 designed to operate over a GSM network, a GPRS network, an EDGE network, a WiFi or WiMax network, and a Bluetooth network. In particular, the wireless communication subsystems 624 can include For example, device 600 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that the mobile device 600 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 626 can be coupled to a speaker 628 and one or more microphones 630 to facilitate voice-enabled functions, such as voice recognition, voice replication, digital recording, and telephony functions.

I/O subsystem 640 can include touch screen controller 642 and/or other input controller(s) 644. Touch-screen controller 642 can be coupled to a touch screen 646 or pad. Touch screen 646 and touch screen controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch screen 646; and a pressing of the button for a second duration that is longer than the first duration may turn power to mobile device 600 on or off. The user may be able to customize a functionality of one or more of the buttons. The touch screen 646 can also be used to implement virtual or soft buttons and/or a keyboard.

In some implementations, device 600 can present recorded audio and/or video files, such as MP3, AAC, and MPEG files. In some implementations, device 600 can include the functionality of an MP3 player and may include a pin connector for tethering to other devices. Other input/output and control devices can be used.

Memory interface 602 can be coupled to memory 650. Memory 650 can include high-speed random access memory or non-volatile memory, such as one or more magnetic disk storage devices, one or more optical storage devices, or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers or one or more servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing, including the graphical user interfaces and processes described in reference to FIGS. 1-5; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; dictionary module 672; language model 674; keyboard module 676; and keyboard model 678. The memory 650 may also store other software instructions for facilitating other processes, features and applications.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed implementations can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
receiving a sequence of keyboard events representing keystrokes input to a virtual keyboard of a device;
traversing a hierarchical data structure according to the sequence of keyboard events to determine candidate words;
constructing a word lattice based on a language model, including deriving path weights from candidate word statistics and keyboard error model data, wherein deriving the path weights is based on a function having one or more first parameters including the candidate word statistics and one or more second parameters including the keyboard error model data;
searching the word lattice for N best paths, where N is a positive integer;
determining one or more candidate sentences comprising candidate words based on the N best paths; and
presenting the candidate sentences on a user interface component of the device, where the method is performed by one or more hardware processors of the device.

2. The method of claim 1, wherein presenting the candidate sentences comprises: displaying the candidate sentences on a screen of the device.

3. The method of claim 1, where the hierarchical data structure is a trie data structure.

4. The method of claim 1, where the language represented by the language model is Japanese or Chinese.

5. The method of claim 1, further comprising:
pruning paths in the word lattice based on the path weights.

6. A non-transitory computer-readable medium storing instructions, which, when executed, are operable to cause one or more processors to perform operations comprising:
receiving a sequence of keyboard events representing keystrokes input to a virtual keyboard of a device;
traversing a hierarchical data structure according to the sequence of keyboard events to determine candidate words;
constructing a word lattice based on a language model, including deriving path weights from candidate word statistics and keyboard error model data, wherein deriving the path weights is based on a function having one or more first parameters including the candidate word statistics and one or more second parameters including the keyboard error model data;
searching the word lattice for N best paths, where N is a positive integer;
determining one or more candidate sentences comprising candidate words based on the N best paths.

7. The non-transitory computer-readable medium of claim 6, wherein presenting the candidate sentences comprising:
displaying the candidate sentences on a screen of the device.

8. The non-transitory computer-readable medium of claim 6, where the hierarchical data structure is a trie data structure.

9. The non-transitory computer-readable medium of claim 6, where the language represented by the language model is Japanese or Chinese.

10. The non-transitory computer-readable medium of claim 6, the operations further comprising:
pruning paths in the word lattice based on the path weights.

11. A system comprising: one or more hardware processors;
a non-transitory computer-readable medium storing instructions, which, when executed, are operable to cause the one or more processors to perform operations comprising:

receiving a sequence of keyboard events representing keystrokes input to a virtual keyboard of a device;

traversing a hierarchical data structure according to the sequence of keyboard events to determine candidate words;

constructing a word lattice based on a language model, including deriving path weights from candidate word statistics and keyboard error model data, wherein deriving the path weights is based on a function having one or more first parameters including the candidate word statistics and one or more second parameters including the keyboard error model data;

searching the word lattice for N best paths, where N is a positive integer;

determining one or more candidate sentences comprising candidate words based on the N best paths.

12. The system of claim 11, wherein presenting the candidate sentences comprising:

displaying the candidate sentences on a screen of the device.

13. The system of claim 11, where the hierarchical data structure is a trie data structure.

14. The system of claim 11, where the language represented by the language model is Japanese or Chinese.

15. The system of claim 11, the operations further comprising:

pruning paths in the word lattice based on the path weights;

searching the word lattice for N best paths, where N is a positive integer; and determining one or more candidate sentences comprising candidate words based on the N best paths.

16. The system of claim 11, the operations comprise pruning the word lattice by traversing the sequence of keyboard events in a plurality of iterations, including:

for each key of the virtual keyboard hypothesized to have been touched in the sequence of keyboard events, determining a likelihood of the key being touched and discarding a path in the word lattice that corresponds to a candidate word that corresponds to the key upon determining that the likelihood of the key being touched is less than a first threshold; and for each key of the virtual keyboard hypothesized to have been touched in the sequence of keyboard events, determining an averaged likelihood by averaging the likelihood of the key being touched and an average likelihood determined in a prior iteration, the average likelihood determined in the prior iteration being an average of likelihood associated with one or more previously iterated keys, and discarding a path in the word lattice that corresponds to a candidate word that corresponds to the key upon determining that the average likelihood is less than a second threshold.

17. The system of claim 16, wherein each likelihood is a log likelihood.

18. The system of claim 11, where the hierarchical data structure is a trie data structure comprising a plurality trie nodes, each trie node including a sort keys data field, a probability data field, and a word address data field, the sort keys data field storing a plurality of forms of a character of the language, the probability data field storing data indicating a relative probability that characters associated with the trie node follow characters associated with an ancestor of the trie node, the word address data field storing an address of a location of a first word in a word list with which the trie node is associated.

* * * * *